CONTENT ADDRESSABLE MEMORY

Filed Aug. 31, 1964 2 Sheets-Sheet 1

INVENTORS
RALPH J. KOERNER
ALFRED D. SCARBROUGH
BY Arthur Frederick
ATTORNEY

INVENTORS
RALPH J. KOERNER
ALFRED D. SCARBROUGH
BY
Arthur F. Nulich
ATTORNEY

United States Patent Office 3,402,394

Patented Sept. 17, 1968

3,402,394

CONTENT ADDRESSABLE MEMORY

Ralph J. Koerner, Canoga Park, and Alfred D. Scarbrough, Northridge, Calif., assignors to The Bunker-Ramo Corporation, Canoga Park, Calif., a corporation of Delaware Filed Aug. 31, 1964, Ser. No. 393,220
14 Claims. (Cl. 340—172.5)

ABSTRACT OF THE DISCLOSURE

A content addressable memory for simultaneously comparing a search word with a plurality of stored words in accordance with different comparison criteria. The search word digits are compared in sequence, from most to least significant, with the stored word digits with a mismatch signal being generated at each stored word digit mismatching the corresponding search word digit. Different comparison criteria can be defined for different portions of the search word by controlling the coupling of the mismatch signals to a bank of match indicators.

This invention relates generally to digital memories and more particularly to improvements in content addressable memories.

U.S. Patent No. 3,031,650 discloses some basic content addressable memory implementations and discusses the characteristics which distinguish such memories from conventional digital memories. Briefly, the significant distinguishing characteristic is that each word location in a content addressable memory is not uniquely identified by an address as in conventional digital memories but instead content addressable memory locations are selected on the basis of information stored therein; i.e., the contents thereof. Hence, comes the name "content addressable memory."

As a result of selecting locations on the basis of stored information, memory search times can be considerably reduced. That is, in situations where it is desired to select those locations, out of N locations in memory, storing words matching a search word, information identifying those locations can be derived in one memory access period instead of the N such periods required by conventional digital memories. More particularly, whereas it is necessary in a conventional digital memory to sequentially access the contents of each location and compare each accessed word with a search word, comparison of the search word with all the stored words can be simultaneously effected in a content addressable memory.

Essentially, a content addressable memory operates by causing a signal representative of a search word digit to be applied simultaneously to all memory elements storing bits of corresponding significance. Some type of logic means is provided in the memory, such means being operable to generate signals to indicate whether the digits stored in the various memory elements are the same as or different from the corresponding search digit being sought. All elements of a single memory word location are coupled to a common word sense line and by sensing resultant signals appearing on the word sense line, a determination is made as to whether or not the word stored in the memory location associated with the word sense line matches or mismatches the search word.

Whereas the content addressable memory embodiment disclosed in the aforementioned U.S. Patent No. 3,031,650 performs a search which considers all stored digits in parallel, as well as all stored words, U.S. Patent No. 3,297,995, assigned to the same assignee as the present application, discloses a content addressable memory embodiment which causes the digits of stored words to be considered serially or sequentially, while the words are still considered in a parallel fashion. Further, whereas the content addressable memory disclosed in the cited U.S. Patent No. 3,031,650 does not specifically discuss the utilization of any search criterion other than "exact match," the cited patent application discloses apparatus which permits other search criteria to be specified. Thus, the search word can be compared with every stored word to determine whether, among other criteria, it exactly matches or is "greater than or equal to" or "less than or equal to." By incorporating the ability to simultaneously compare a search word with a plurality of stored words in accordance with different criteria, an exceedingly useful content addressable memory system is provided. In addition to the foregoing criteria, many prior art systems permit a mask criterion to be defined with respect to selected search word digits which causes the search results to ignore any affects produced by the masked digit.

It has further been recognized that a content addressable memory system in which the comparison criterion could be selectively modified for different portions of the search word would represent a further and extremely significant advance in the state of the art.

Thus, it is an object of the present invention to provide a content addressable memory system which permits two or more search criteria, in addition to a mask criterion, to be specified for different portions of a search word while still permitting a search word to be simultaneously compared with each of a plurality of stored words in a single memory scan or cycle.

In addition to providing a content addressable memory in which the search criteria with respect to different portions of a search word can be different, it is also desirable to provide such a memory in which stored words can be compared with different search words in accordance with the same or different criteria. That is, it may be desired to know, for example, whether any words stored in the memory are equal to a first search word and greater than or equal to a second search word. In view of this, it is an object of the present invention to provide a content addressable memory which enables stored words to be compared with more than one search word using more than one search criteria.

Thus, in accordance with one aspect of the invention, means are provided in a content addressable memory which enable different comparison criteria to be selectively specified with respect to different portions of a search word. In accordance with a further aspect of the invention, means are provided in a content addressable memory which enable stored words to be compared with more than one search word and which further enable match indications to be developed representing the logical product of the comparisons of all of the stored words with each of the search words.

More particularly, in a preferred embodiment of the invention, all the digits of a search word are compared in sequence during a single scan or cycle with corresponding digits of all the words stored in memory. A mismatch signal is developed at each digit storage location in memory if the state of the stored digit does not match the state of the corresponding search word digit. If the search word digits are considered in order from most to least significant, then the state of the search word digit corresponding to the stored digit at which the initial mismatch signal is developed in each memory word location indicates whether the stored word is equal to, greater than or equal to, or less than or equal to the search word. The development of the initial mismatch signal from any word location is sensed and stored in a bistable match sense indicator dedicated to that word location. Coupled to each match sense indicator is a bistable match store indicator. When any match sense indicator switches to its mismatch state, the switching is transferred to the match store indicator coupled thereto unless inhibited by logic means responsive to a register defining the comparison criterion. For example, assume that a "greater than or equal to" criterion is specified and the most significant digit of the search word is a binary "0" while the most significant digit of a stored word is a binary "1." When these bits are compared, a mismatch signal will be developed inasmuch as the states of the digits are dissimilar. Although this mismatch signal is sensed and stored by the appropriate match sense indicator, coupling between the match sense indicator and the match store indicator should be inhibited inasmuch as the stored word is in fact greater than the search word and thus does match the search word within the defined criterion.

In accordance with the present invention, a new criterion can be specified for a portion of the search word to be compared by resetting the match sense indicators to a match state. This has the effect of permitting a subsequently developed mismatch signal to be treated as an initial mismatch signal which will be coupled through to the match store indicator unless inhibited by the logic means responsive to the register defining the new criterion. The register can store several criteria which can be used in sequence.

All of the stored words can be compared with different search words by performing successive searches and by resetting all of the match sense indicators at the end of each search but by retaining the indications in the match store indicators. Thus, only the stored words which match all of the search words will be indicated as matching at the termination of the successive searches.

The novel features that are considered characteristic of this invention are set forth with particularity in the appended claims. The invention itself both as to its organization and method of operation, as well as additional objects and advantages thereof, will be better understood from the following description, read in connection with the accompanying drawings, in which:

Figure 1:
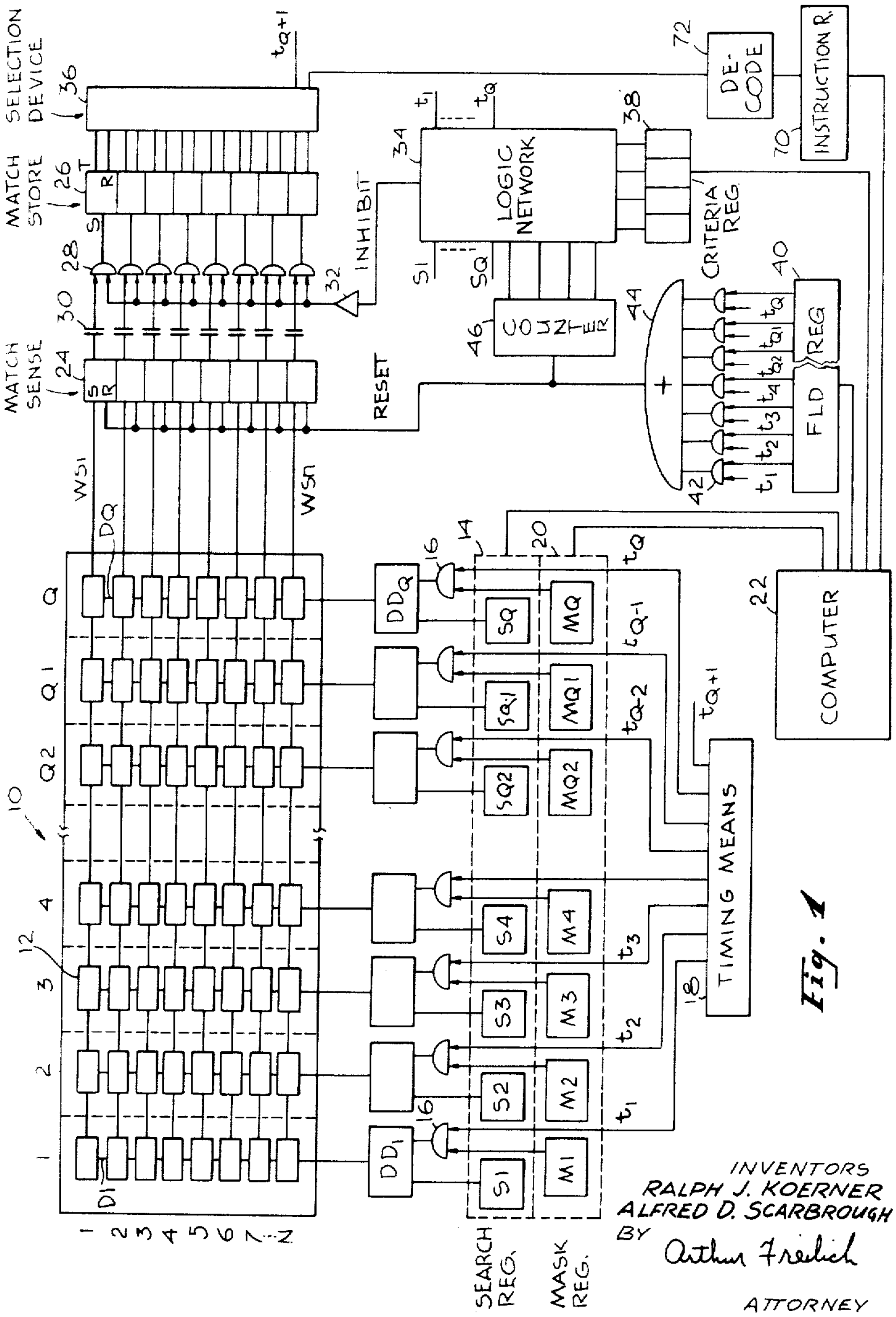
FIGURE 1 is a block diagram of a content addressable memory system constructed in accordance with the present invention.

Attention is now called to FGURE 1 which illustrates a block diagram of a content addressable memory system constructed in accordance with the present invention. The system includes a matrix 10 of memory elements 12 arranged in N rows and Q columns. The matrix 10 can be of the type disclosed in the aforecited U.S. patent application. Thus, all of the memory elements 12 in each of the Q matrix columns are coupled to a different one of the digit lines D1–DQ. All of the memory elements in each of the N matrix rows are coupled to a different one of the N word sense lines WS1–WS*n*.

Each of the rows in the matrix 10 defines a memory word location adapted to store a word comprised of Q digits. As disclosed in the aforecited U.S. patent application, a search word stored in the Q storage elements S1–SQ of a search register 14 can be compared simultaneously with all of the words stored in the matrix 10 by applying appropriate interrogation signals to the digit lines D1–DQ. Briefly, the search word is compared with all stored words by applying interrogation signals to the digit lines which interrogation signals are representative of the state of the corresponding storage element in the search register 14. Each interrogation signal is coupled to all of the memory elements in a different one of the matrix columns and as a consequence, a mismatch signal is developed on the word sense lines associated with those memory elements which define a state different from that defined by the corresponding storage element. As an example, assume that the storage element S4 defines a binary "0" state and that the memory element in column 4 and row 5 of the matrix defines a binary "1" state. By applying an interrogation signal to the digit line D4 representative of the state of the storage element S4, a mismatch signal will be developed on the word sense line WS5.

The output of each of the storage elements in the search register 14 is connected to the input of a different one of Q digit drivers DD1 through DDQ. Also connected to the input of each of the digit drivers is the output of an AND gate 16. When any of the AND gates 16 are enabled, the digit driver connected to the output thereof will apply an interrogation signal representative of the state of the storage element connected thereto to the digit line connected to the output thereof.

A timing means 18 capable of defining a plurality of distinct time periods $t_1-(t_Q+1)$ is provided. The timing means 18 includes a plurality of output terminals each of which is energized during a different one of the defined time periods. Each of the initial Q output terminals of the timing means 18 is connected to the input of a different one of the AND gates 16. The second input to each of the AND gates 16 is derived from the output of a different stage of a mask register 20. The mask register 20 includes Q stages identified as M1–MQ and is utilized to define those columns of the matrix which are to be masked or in other words not searched, during the course of a search.

In the operation of the content addressable memory system of FIGURE 1 as disclosed thus far, assume that a word is stored in each of the N locations of the matrix 10. In addition, assume that a search word has been entered into the search register 14 by a computer or other information source 22 and that a mask word has been similarly entered into the mask register 20. Further, for the sake of simplicity, let it be assumed that for each matrix column desired to be masked, a binary "0" is stored in the corresponding stage of the mask register 20.

At time $t_1$, assuming stage M1 of the mask register 20 to store a binary "1," AND gate 16 connected to digit driver DD1 will be enabled to cause an interrogation signal to be applied to digit line D1 which represents the state of storage element S1. As a consequence, mismatch signals will be developed on each of the word sense lines associated with a memory element in column 1 of the matrix whose state is different from the state of storage element S1.

Each of the word sense lines is connected to a different stage of a match sense register 24 comprised of N bistable match sense indicators, each of which has set and reset input terminals and an output terminal. Each of the word sense lines is connected to the set input terminal of a different one of the match sense indicators. Each match sense indicator responds to the appearance of a mismatch signal on the word sense line coupled thereto by switching to a mismatch state. The application of a signal to the reset input terminal of a match sense indicator switches the indicator back to a match state.

Continuing with the operation of the system thus far described, in each of the timing periods, mismatch signals will be developed on each of the word sense lines associated with memory elements whose state is different from the state of the corresponding search register storage element. Of course, if the mask register stage corresponding to any one of the matrix columns stores a binary "0," then no mismatch signals will be developed in the corresponding time period inasmuch as no interrogation signal will be provided by the corresponding digit driver. Assuming that prior to time period $t_1$ all of the match sense indicators define a match state, at the end of the time period $t_q$, only those match sense indicators associated with stored words identically matching the unmasked portions of the search word will still store a match state.

From the foregoing, it should be apparent that means have thus far been provided and described which enable an "exact match" search to be conducted, which simultaneously compares a search word for identity with each of a plurality of stored words. In the aforecited U.S. patent application, it is recognized that search criteria other than "exact match" can be utilized by noting the state of the appropriate search register storage element when the initial mismatch signal in each of the matrix locations is developed. As an example, assume that the most significant digit of the search and stored words is contained in matrix column 1 and progressively less significant digits are contained in matrix columns 2–Q. Also assume that storage element S1 defines a "1" state and the memory element in row 5 and column 1 of the matrix 10 defines a "0" state. During time period $t_1$, a mismatch signal will be developed on word sense line WS5 and a conclusion can immediately be drawn that the magnitude of the word stored in location 5 of the matrix is less than the search word. On the other hand, if the row 5, column 1 memory element stored a "1" no mismatch signal would be developed during time period $t_1$ and no conclusion could be drawn as to the relative magnitudes betwen the search word and the word stored in location 5 of the matrix. If a mismatch signal is developed during time period $t_2$, a conclusion as to relative magnitude can be drawn. Thus, assume a binary "0" is stored in search register storage element S2 and a binary "1" is stored in row 5, column 2 of the matrix. The mismatch signal consequently developed on word sense line WS5 indicates, if it is the initial mismatch signal developed for that word location, that the magnitude of the word stored in location 5 of the matrix is greater than the search word.

Accordingly, it should be apparent that by determining the state of the appropriate search register storage element when the initial mismatch signal is developed on each of the word sense lines, a conclusion can be drawn as to whether the word stored in the location associated with that word sense line is greater than or less than the search word.

The match sense indicators 24 are responsive to the initial mismatch signal developed on the word sense lines. That is, an initial mismatch signal will set the associated match sense indicator and a subsequent mismatch signal will have no effect on the indicator unless the indicator is reset some time between the occurrence of the mismatch signals. The aforecited U.S. patent application teaches means for developing signals which indicate whether stored words match a search word within a defined criterion. That is, if a stored word has a magnitude greater than the search word, and a "greater than or equal to" search criterion is defined, then an indication should be developed which indicates that the stored word matches the search word within the stated criterion. The means for accomplishing this function includes a match store register 26 comprised of N match store indicators each having set and reset input terminals and an output terminal. Connected to the set input terminal of each of the match store indicators is the output of an AND gate 28. The output of each of the match sense indicators 24 is AC coupled, as for example through a capacitor 30, to the input of the AND gate 28. A second input to each of the AND gates 28 is connected through an inverter 32 to the output of a logic network 34. The output of the logic network 34 is normally false and thus the output of the inverter 32 to the AND gates 28 is normally true. Thus, whenever the initial mismatch signal appears on any of the word sense lines, the corresponding match sense indicator is set and its switching in turn causes the corresponding match store indicator to be set unless the AND gates 28 are blocked by the logic network 34 developing a true inhibit output signal. If a "greater than or equal to" search criterion is defined, then the gates 28 should be blocked during those time periods in which interrogation signals representative of search register storage elements storing a binary "0" are developed. That is, if the initial mismatch signal for any stored word is developed when a search word "0" digit is being compared, then the stored word developing that mismatch signal is necessarily greater than the search word and consequently the match store indicator corresponding thereto should not be switched to a mismatch state but rather should retain a match state. The match sense indicator connected thereto should, of course, be switched to a mismatch state to assure that it does not respond to any subsequently developed mismatch signal which of course is not in fact the initial mismatch signal.

Connected to the output of the match store indicators is a selection device 36 which is normally enabled during time period $t_Q+1$ to commutate or successively sample the match store indicators. The selection device 36 can reset each of the match store indicators as its state is sampled.

The details of the system thus far described are set forth with more preciseness and clarity in the aforecited U.S. patent application. The foregoing explanation has been offered for the purpose of demonstrating the significance and utility of the present invention which significantly extends the capability of previously described content addressable memory systems. In order to demonstrate the function of a system constructed in accordance with the present invention, attention is called to FIGURE 2 which illustrates an exemplary word format. Assume that Q equals 30 and that the first 14 digits in each stored word represent the identification number of an employee. Assume that the subsequent four digits identify the department in which the employee works. Further assume that the subsequent six digits indicate the employee's age and the last six digits represent the employee's annual salary. Also assume that each of the N locations in the matrix 10 stores a word having the format of FIGURE 2 and that the matrix contains information describing all of the employees of a certain company which, for example, has a total employment of several thousand persons. Let it be assumed that the company management desires to quickly determine whether any employees in the XYZ department who are older than 40 years of age have an annual salary of less than $5,000,00. Recognizing that the content addressable memory system thus far described is capable of performing "exact match," "greater than or equal to," and "less than or equal to" searches, it should be apparent that those employees that fit into the stated category can be located. The present invention is directed to apparatus for most efficiently performing a search with respect to several different search criteria.

In order to perform a search according to the above-detailed exemplary problem, a search word has to be formed in which digits 15 through 18 specify the XYZ department, digits 19 through 24 specify 40 years of age, and digits 25 through 30 specify a $5,000.00 annual salary. Nothing need be specified in the initial 14 digits of the search word. In addition to entering a search word into the search register 14 (FIGURE 1), the mask register 20 must be loaded and to accomplish the desired search "0" digits should be entered in the first 14 storage elements thereof. In order to store the search criteria information, a criteria register 38 is provided which is loaded from the computer 22. Let it be assumed that four different search criteria can be specified with respect to any search word and consequently that the register 38 has four portions each of which is connected to the logic network 34.

In order to indicate when the search criteria should be changed, a field register 40 is provided, which register includes Q stages. The field register is also loaded by the computer 22 and let it be assumed that a "1" digit will be stored in each stage of the field register which corresponds to the initial digit position of each of the fields of the stored words. Thus, let the field register 40 store "1" digits in digit positions 1, 15, 19 and 25.

The output terminal from each stage of the field register 40 is connected to the input of a different AND gate 42. The second input to each of the AND gates 42 is derived from a different one of the initial Q output terminals of the timing means 18. The outputs of all of the AND gates 42 are connected to the input of an OR gate 44 whose output is connected to the reset input terminals of all of the match sense indicators 24. In addition, the output of the OR gate 44 is connected to the input terminal of a counter 46 which is provided with four output terminals.

The system of FIGURE 1 constructed in accordance with the invention is thus able to compare a search word with all of the stored words utilizing several different search criteria. In the operation of the system in accordance with the aforementioned exemplary data processing problem, during time period $t_1$, the "1" in stage one of the field register will reset the match sense indicators and will force counter 46 to its first state. During time period $t_1$ through $t_{14}$, no interrogation signals will be applied to the digit lines of the matrix 10 as a consequence of "0" digits being stored in the initial 14 stages of the mask register 20. During time $t_{15}$, the "1" digit in the digit position 15 of the field register 40 will cause OR gate 44 to provide an output signal to again reset all the match sense indicators (none of which had been set, in periods $t_1$–$t_{14}$, in the present example). In addition, the counter 46 will be incremented by one. The count stored in the counter 46 determines which portion of the criteria register 38 will be applied to the logic network 34 for determining when a true inhibit signal should be developed. During time periods $t_{15}$ through $t_{19}$, in accordance with the foregoing example, an "exact match" search criterion will be defined and thus the gates 28 will not be blocked during this interval. Accordingly, if mismatch signals are applied to any of the word sense lines during periods $t_{15}$ through $t_{18}$, the match sense indicators 28 will be set to in turn set the corresponding match store indicators.

During time period $t_{19}$, the "1" digit in the digit 19 position of the field register 40 will cause OR gate 44 to provide a true output signal to again reset the match sense indicators 24. By resetting the match sense indicators 24, subsequently developed mismatch signals appearing on the word sense lines will again be treated as initial mismatch signals capable of setting the match sense indicators and thus coupling signals to set the match store indicators. The counter 46 will also be incremented during time period $t_{19}$ thus causing the third portion of the criteria register 38 to be coupled to the logic network 34. In accordance with the foregoing example, during time periods $t_{19}$ through $t_{24}$, a "greater than or equal to" criterion will be defined. Thus, during each time period in this interval, the logic network 34 will provide a true inhibit output signal when the search digit being compared is a "0."

During time period $t_{25}$, the match sense indicators 24 will again be reset so that any initial mismatch signals occurring in the last six digit field will set the match sense indicators. Thus, it should be appreciated that at the conclusion of time period $t_Q$, only those match store indicators associated with words which have fields matching the search word fields within the stated criteria will define match indications. All other match store indicators will have been switched to a mismatch state some time between time periods $t_{15}$ and $t_{30}$. In the foregoing explanation, it has been assumed that appropriate time delays are incorporated in the system of FIGURE 1 which permit OR gate 44 to reset the match sense indicators during the same time periods.

Figure 3:
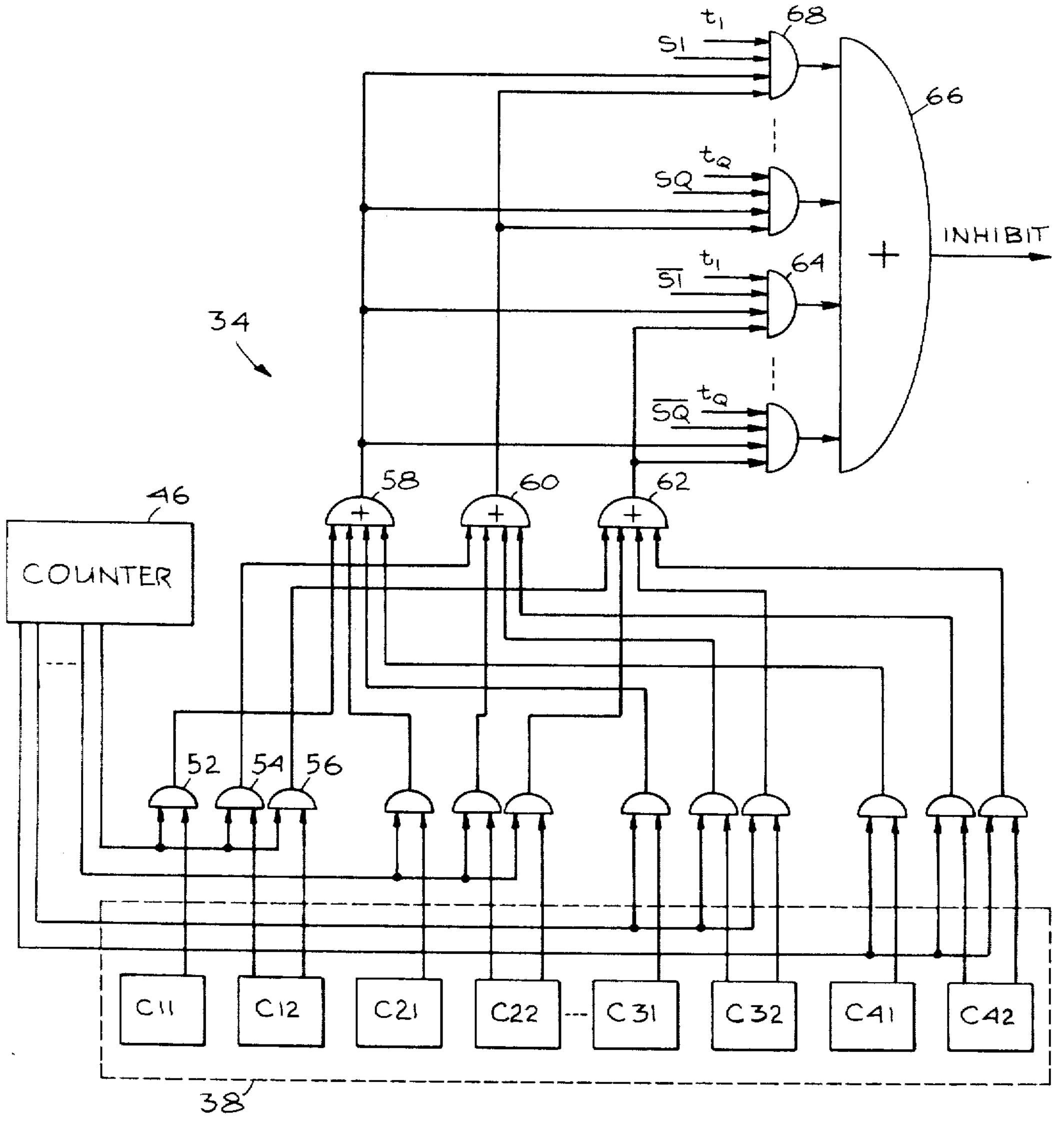
FIGURE 3 is a block diagram of the logic network of FIGURE 1.

Attention is called to FIGURE 3 which illustrates a logical block diagram of the counter 46, the criteria register 38, and the logic network 34. For purposes of example, each of the four portions of the criteria register 38 is illustrated as including a pair of flip-flops which together can define the three different search criteria discussed herein. The true output terminal of flip-flop C1–1 is connected to the input of an AND gate 52 and the true and false output terminals of flip-flops C1–2 are respectively connected to the inputs of AND gates 54 and 56. The initial output terminal of the counter 46 is connected to the inputs of all of the AND gates 52, 54, and 56. The flip-flops of the second, third, and fourth portions of the criteria register 38 are similarly connected through three AND gates. The output of AND gate 52 is connected to the input of an OR gate 58. The output of AND gate 54 is connected to the input of an OR gate 60, and the output of AND gate 56 is connected to the input of an OR gate 62. The outputs of the three AND gates associated with each of the other portions of the criteria register 38 are similarly connected to the inputs of the OR gates 58, 60, and 62.

As previously noted, when a "greater than or equal to" search criterion is defined, a true inhibit output signal has to be developed during each time period in which the search digit being compared is a "0" digit. In order to develop this output signal, a series of Q AND gates 64 are provided each of which has an input connected to a different one of the timing means 18 output terminals. Also connected to the input of each of the AND gates 64 is the false output terminal of the corresponding storage element of the search register. The output of OR gate 58 is connected to the input of all of the gates 64. The output of OR gate 62 is likewise connected to the input of all of the gates 64. When OR gates 58 and 62 both provide true output signals, a "greater than or equal to" criterion is defined. The outputs of all of the AND gates 64 are connected to the input of an OR gate 66. Thus, when a "greater than or equal to" search criterion is defined and during each digit period in which the search register search element being compared is false or defines a "0" state, OR gate 66 will provide a true inhibit signal which will block the gates 28 of FIGURE 1.

A "less than or equal to" criterion is defined when both the OR gates 58 and 60 provide true output signals. The outputs of OR gates 68 and 60 are connected to all of the inputs of AND gates 68. Q AND gates 68 are provided, each of which has an input connected to a different one of the initial Q output terminals of the timing means 18. Also connected to the input of each of the AND gates 68 is the true output terminal of a different one of the search register storage elements. Thus, when a "less than or equal to" search criterion is defined, a true inhibit output signal will be developed during those time periods in which the storage element being compared defines a "1" state. The count in the counter 46 of course determines which of the portions of the criteria register 38 controls the gates 58, 60, and 62.

Figure 2:
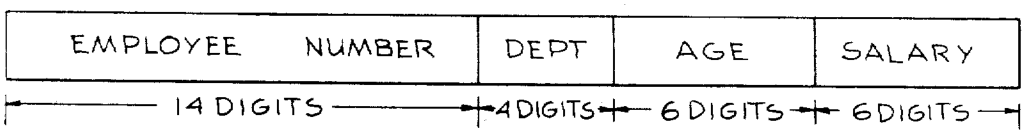
FIGURE 2 illustrates an exemplary word format which demonstrates the utility of the present invention.

From the foregoing, it should be appreciated that a content addressable memory system has been provided herein which enables a search word to be simultaneously compared with a plurality of stored words utilizing a different search criterion for different portions of the search word. Although it has been assumed herein that only four different search criteria can be employed in a single search through the Q matrix columns, it should be appreciated that in actuality the criterion can be changed for each of the matrix columns. It should also be recognized that the fields illustrated in the exemplary word format of FIGURE 2 are not in any sense hardware restricted but are merely defined by the contents of the field register 40. That is, the resetting of the match sense indicators effectively controls the beginning of a field and thus permits the first mismatch signal subsequently developed on each word sense line to set a match sense indicator. The match store indicators 26 are not reset during the course of the initial Q time periods and thus effectively accumulate information as to whether previously compared search word digits matched the corresponding stored word digits within the defined criteria.

It has been previously pointed out that during time period $t_Q+1$ the selection device 36 is normally energized to sequentially process the indications stored by the match store indicators 26. In certain instances, it is not desired to immediately process the indications stored by the match store indicators but rather it is desired to perform subsequent searches whose indications are further accumulated with the indications stored by the match store indicators. Thus, assume that in the foregoing exemplary problem, it is desired to eliminate from the list of employees matching the original criteria, all those employees who are over 60 years of age. In other words, it is desired to know which employees in department XYZ between the ages of 40 and 60 earn less than $5,000.00 per year. By retaining the states of the match store indicators at the completion of the first search, a subsequent search could be conducted utilizing a search word incorporating the age of 60 in the digit positions 19 through 24 and a "less than or equal to" search criterion. At the completion of the second search, the states of the match store indicators will reveal which employees satisfy the conditions expressed by both search words and the accompanying search criteria.

In order to selectively inhibit the action of the selection device at time $t_Q+1$, an instruction register 70 controlled by the computer 22 is connected to a decoding circuit 72. Whenever the instruction register indicates that successive searches are to be conducted and the match store indicators are to accumulate the match indications, the decoding circuit 72 will inhibit the activity of the selection device 36 at the end of the initial search. In order to enable any number of successive searches to be conducted without resetting the match store indicators, the instructions provided by the computer 22 could specify the number of successive searches to be performed. A counter could be provided to keep track of the cycles of the timing means 18 and only when the counter and the number of searches indicated in the instruction register coincide, would the selection device 36 be permitted to function.

The embodiments of the invention in which an exclusive property or privilege is claimed are defined as follows.

We claim:

1. A content addressable memory system including:
- a matrix of memory elements arranged to define a plurality of word storage locations, each location adapted to store a word comprised of a plurality of digits;
- means defining a search word having a plurality of digits;
- means for selectively defining a first comparison criterion for a first group of said search word digits and a second comparison criterion for a second group of said search word digits;
- means for scanning said memory by sequentially comparing each search word digit simultaneously with all of the corresponding stored word digits to determine during a single scan whether each search word digit matches the stored word digits in accordance with the criterion defined therefor; and
- means for providing a match indication for each of said stored words all of whose digits match the corresponding search word digits in accordance with the criterion defined therefor.

2. The system of claim 1 wherein one of said criteria comprises a "greater than or equal to" magnitude comparison criterion.

3. The system of claim 1 wherein one of said criteria comprises a "less than or equal to" magnitude comparison criterion.

4. A content addressable memory system including:
- a matrix of memory elements arranged to define a plurality of word storage locations, each location adapted to store a word comprised of a plurality of digits;
- means defining a search word having a plurality of digits;
- means for selectively defining a first comparison criterion for a first group of said search word digits and a second comparison criterion for a second group of said search word digits;
- means for sequentially comparing each search word digit simultaneously with all of the corresponding stored word digits and for providing a mismatch signal for each mismatching stored word digit;
- a plurality of match sense indicators each of which is associated with a differential location and responsive to a mismatch signal, provided as a consequence of a comparison with an element of that location, by switching to a mismatch state;
- a plurality of match store indicators each of which is responsive to the switching of a different match sense indicator for switching to a mismatch state; and
- means responsive to both the state of each search word digit and to the comparison criterion defined therefor, for selectively inhibiting said match store indicators from switching.

5. A content addressable memory system including:
- a matrix of memory elements arranged to define a plurality of word storage locations, each location adapted to store a word comprised of a plurality of digits;
- means defining a search word having a plurality of digits;
- timing means defining a cycle comprised of a plurality of successive time periods equal in number to said plurality of search word digits;
- means defining at least first and second comparison criteria other than a mask criterion;
- means for identifying different ones of said first and second comparison criteria during successive time periods of a single cycle; and
- means for comparing a different search word digit simultaneously with all of the corresponding stored word digits during each of said successive time periods in accordance with the criterion defined during that period.

6. A content addressable memory system including:
- a matrix of memory elements arranged to define a plurality of word storage locations, each location adapted to store a word comprised of a plurality of digits;
- means defining a search word having a plurality of digits;
- timing means defining a plurality of successive time periods;
- means defining a series of comparison criteria including at least two criteria other than a mask criterion;
- means identifying selected ones of said time periods during a single cycle;
- means for initially identifying a first of said series of comparison criteria during a first of said selected time periods and for subsequently identifying succeeding ones of said series of criteria during succeeding ones of said selected time periods; and
- means for comparing a different search word digit simultaneously with all of the corresponding stored word digits during each of said selected time periods in accordance with the criterion identified during that period.

7. A content addressable memory system including:
- a matrix of memory elements arranged to define a plurality of word storage locations, each location adapted to store a word comprised of a plurality of digits;
- means defining a search word having a plurality of digits;

timing means defining a plurality of successive time periods;
means defining a series of comparison criteria;
means identifying selected ones of said time periods;
means for initially identifying a first of said series of comparison criteria and for subsequently identifying a succeeding one of said series of criteria during each of said selected ones of said time periods;
means for comparing a different search word digit simultaneously with all of the corresponding stored word digits in each of said time periods and for providing a mismatch signal for each mismatching stored word digit;
a plurality of match sense indicators each of which is associated with a different location and is responsive to a mismatch signal, provided as a consequence of a comparison with an element of that location, by switching to a mismatch state;
a plurality of match store indicators each of which is responsive to the switching of a different match sense indicator for switching to a mismatch state; and
means responsive to both the state of each search word digit compared during each of said time periods and to the criterion identified during that period for selectively inhibiting said match store indicators from switching.

8. A content addressable memory system including:
a matrix of memory elements arranged to define a plurality of word storage locations, each location adapted to store a word comprised of a plurality of digits;
means defining a search word having a plurality of digits;
timing means defining a plurality of successive time periods;
a plurality of groups of storage elements, each group storing a different comparison criterion;
means identifying selected ones of said time periods;
a counter;
means for incrementing said counter during each of said selected ones of said time periods;
a logic circuit;
means for coupling a different group of storage elements to said logic circuit in response to each different count defined by said counter;
means for comparing a different search word digit simultaneously with all of the corresponding stored word digits in each of said time periods and for providing a mismatch signal for each mismatching stored word digit;
a plurality of match sense indicators each of which is associated with a different location and is responsive to a mismatch signal, provided as a consequence of a comparison with an element of that location, by switching to a mismatch state;
a plurality of match store indicators each of which is responsive to the switching of a different match sense indicator for switching to a mismatch state; and
means responsive to both the state of each search word digit compared during each of said time periods and to said logic circuit for selectively inhibiting said match store indicators from switching.

9. A content addressable memory system comprising:
a matrix of memory elements respectively including N rows of elements, each row comprising a memory location capable of storing a word, and Q columns of elements, each column including a correspondingly positioned memory element from each location;
Q storage elements;
a plurality of digit lines each of which is associated with all of the elements of a different one of said matrix columns and a different one of said Q storage elements;
a plurality of word sense lines each of which is associated with all of the elements of a different one of said matrix rows;
a plurality of match sense indicators each of which is connected to a different one of said plurality of word sense lines;
a plurality of match store indicators each of which is associated with a different one of said match sense indicators;
means defining a plurality of time periods;
means for applying an interrogation signal to a different one of said digit lines during each of said time periods, each interrogation signal respectively representing the state of a different one of said Q storage elements;
means responsive to the interrogation signal applied to each of said digit lines for comparing the state of all of said memory elements associated therewith with the state of the corresponding storage element and for providing a mismatch signal on each of said word sense lines associated with a memory element having a state different from the state of the corresponding storage element;
means identifying a plurality of selected ones of said time periods;
means defining a series of different comparison criteria;
means for identifying a different one of said comparison criteria during each of said selected ones of said time periods; and
means responsive to the identified comparison criterion and the state of the storage element represented during each of said time periods for selectively coupling said match sense indicators to said match store indicators.

10. The system of claim 9 including means for resetting said match sense indicators during each of said selected ones of said time periods.

11. The system of claim 10 wherein said means for identifying a different one of said comparison criteria includes a counter capable of defining a different count corresponding to each of said comparison criteria; and
means for incrementing said counter during each of said selected ones of said periods.

12. The system of claim 9 including means for normally resetting said match store indicators after said plurality of time periods; and
means for selectively inhibiting said match store indicators from being reset.

13. A content addressable memory system including:
a matrix of memory elements arranged to define a plurality of word storage locations, each location adapted to store a word comprised of a plurality of digits;
a plurality of match store indicators each of which is capable of defining a match or mismatch state and each of which is associated with a different one of said locations;
means for comparing said search word with the words stored in each location and for switching those match store indicators associated with mismatching stored words to said mismatch state;
means for normally clearing said match store indicators prior to subsequently comparing said stored words with a search word; and
means for selectively inhibiting said match store indicators from being cleared prior to subsequently comparing said stored words with a search word in order to accumulate the results of successive comparisons of said search word.

14. The system of claim 13 including means for defining different comparison criteria; and wherein said means for comparing said search word with said stored words includes means responsive to the defined comparison criterion.

(References on following page)

References Cited

UNITED STATES PATENTS

| | | | |
|---|---|---|---|
| 3,264,616 | 8/1966 | Lindquist | 340—172.5 |
| 3,271,744 | 9/1966 | Petersen et al. | 340—172.5 |
| 3,290,659 | 12/1966 | Fuller et al. | 340—172.5 |
| 3,297,995 | 1/1967 | Koerner et al. | 340—172.5 |

PAUL J. HENON, *Primary Examiner.*

I. S. KAVRUKOV, *Assistant Examiner.*